(12) United States Patent
Femboeck

(10) Patent No.: US 8,468,880 B2
(45) Date of Patent: Jun. 25, 2013

(54) TEST STAND FOR MOTOR VEHICLES

(75) Inventor: Josef Femboeck, Neuoetting (DE)

(73) Assignee: Cartesy GmbH, Neuoetting (DE)

( * ) Notice: Subject to any disclaimer, the term of this patent is extended or adjusted under 35 U.S.C. 154(b) by 0 days.

(21) Appl. No.: 13/309,645

(22) Filed: Dec. 2, 2011

(65) Prior Publication Data

US 2012/0144908 A1   Jun. 14, 2012

(30) Foreign Application Priority Data

Dec. 9, 2010   (DE) .......................... 10 2010 054 008
Nov. 25, 2011   (DE) .......................... 10 2011 087 143

(51) Int. Cl.
*G01M 17/00*   (2006.01)
(52) U.S. Cl.
USPC ..................................................... 73/116.01
(58) Field of Classification Search
USPC ................. 73/116.01, 116.05, 116.06, 116.07
See application file for complete search history.

(56) References Cited

U.S. PATENT DOCUMENTS

| | | | | |
|---|---|---|---|---|
| 3,651,690 A | * | 3/1972 | Pagdin et al. | 73/116.06 |
| 4,385,518 A | * | 5/1983 | Rickett | 73/118.01 |
| 4,987,962 A | * | 1/1991 | Purguette | 180/53.6 |
| 6,601,441 B1 | * | 8/2003 | Torgerson et al. | 73/116.06 |
| 2004/0000191 A1 | * | 1/2004 | Ben-David | 73/118.1 |
| 2006/0130567 A1 | * | 6/2006 | Ben-David | 73/118.1 |

FOREIGN PATENT DOCUMENTS

| | | | |
|---|---|---|---|
| EP | 315781 A2 | * | 5/1989 |
| WO | WO 03/074987 | | 9/2003 |

* cited by examiner

*Primary Examiner* — Freddie Kirkland, III
(74) *Attorney, Agent, or Firm* — Alston & Bird LLP

(57) ABSTRACT

A test stand for motor vehicles, in particular a roller type or belt conveyor brake test stand, comprising a measuring device (2) that has a measuring sensor (1) for collecting test data, is characterized with respect to an especially flexible and quasi location independent operability by a chargeable energy accumulator (3) for providing the electric energy required to operate the measuring device (2) and by a feeding device (4) for feeding energy into the energy accumulator (3).

17 Claims, 1 Drawing Sheet

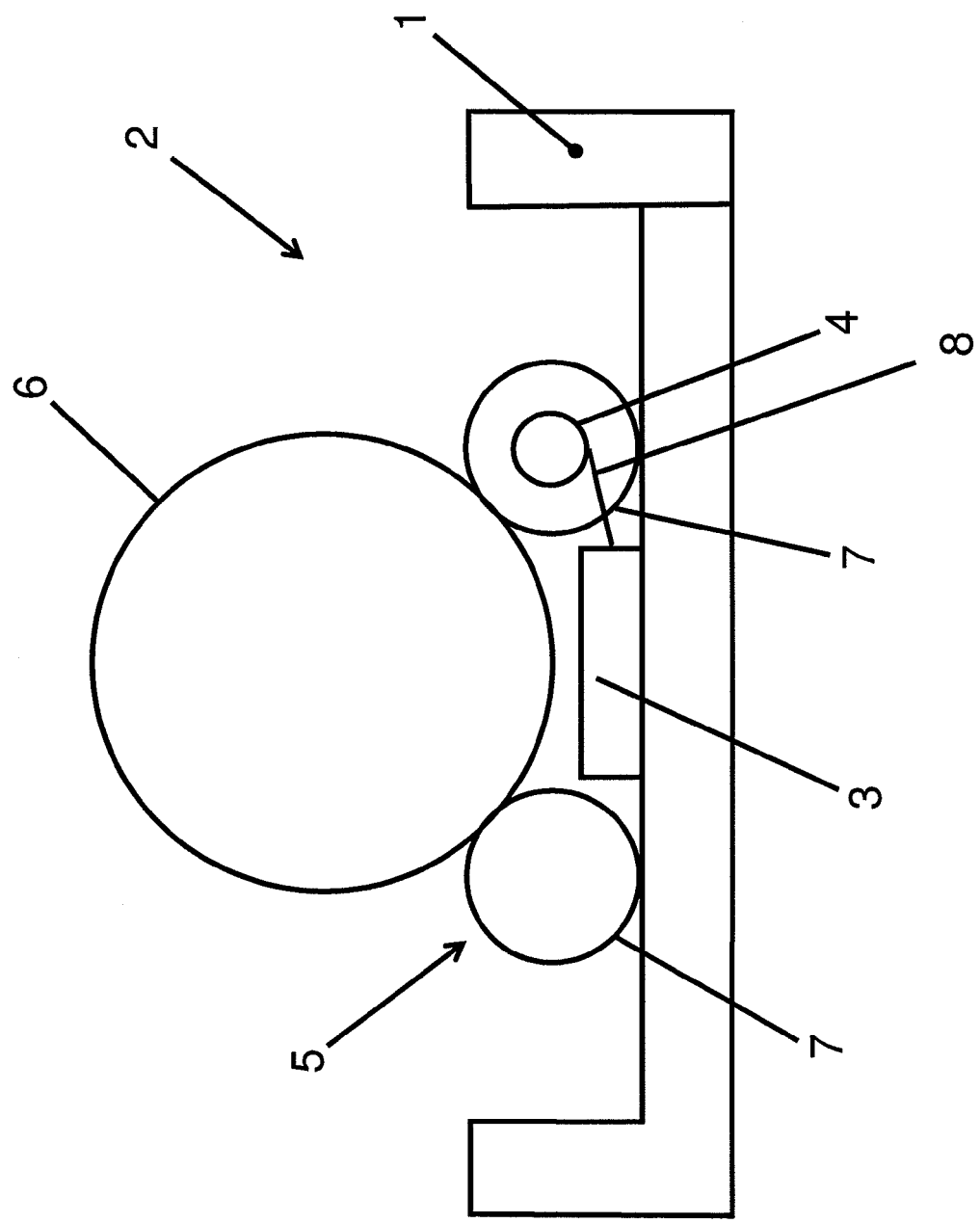

TEST STAND FOR MOTOR VEHICLES

CROSS-REFERENCE TO RELATED APPLICATIONS

This application claims priority from German Application No. 10 2010 054 008.0, filed Dec. 9, 2010, and German Application No. 10 2011 087 143.8, filed Nov. 25, 2011, both of which are hereby incorporated by reference in their entirety.

BACKGROUND

1. Technical Field

The present invention relates to a test stand for motor vehicles, in particular a roller type or belt conveyor brake test stand, comprising a measuring device that has a measuring sensor for collecting test data.

2. Description of Related Art

Test stands of the type described in the introductory part are known in the field and exist in a variety of embodiments. One such test stand for motor vehicles is known, for example, from the WO 03/074987 A1. The prior art test stand has a measuring device for collecting test data. The measuring device comprises a suitable measuring sensor; and in the prior art test stand the acting force on braking the vehicle can be measured.

Test stands of the type described in the introductory part are used, for example, in motor vehicle service centers or other test devices, in particular, when conducting the so-called general inspection for motor vehicles. In order to run the prior art test stands, these test stands are connected to an electric power supply that provides the power that is required to run the respective test stand. This power supply is needed, for example, to drive the rollers or the conveyor belts in roller type or conveyor belt test stands and for the measuring sensor.

The problem with the prior art test stands is that a permanent connection to a power supply is necessary to ensure that they operate reliably. This feature limits the operability of the test stands to defined locations—that is, to such locations, at which there is a suitable power supply. Consequently the result is an extremely limited flexibility with respect to the operability of the test stands at different locations. For example, it is not possible to use the test stands at locations that do not have a power supply.

BRIEF DESCRIPTION

Therefore, the object of the present invention is to design and further develop a test stand of the type described in the introductory part in such a way that an especially flexible and quasi location independent operability is made possible with structurally simple means.

The aforesaid object is solved by a test stand exhibiting the features disclosed in claim 1. According to the invention, the test stand of the type described in the introductory part is designed and further developed in such a way that it has a chargeable energy accumulator for providing the electric energy required to operate the measuring device; and said test stand has a feeding device for feeding energy into the energy accumulator.

First of all, it has been found in an inventive way that it is also possible to operate a test stand for motor vehicles even without a permanent connection to an external power supply. Then it has been found in an additional inventive way that the above described engineering object of the invention can be achieved in a surprisingly simple way by providing a test stand with a chargeable energy accumulator for providing the electric energy required to operate the measuring device in connection with a feeding device for feeding energy into the energy accumulator. Due to the chargeable energy accumulator the test stand becomes location independent and can also be operated without the presence of an external power supply. Furthermore, the test stand has a feeding device for feeding the energy into the energy accumulator. With such a feeding device a simple charging of the energy accumulator quasi on-site is simplified.

Consequently the test stand according to the invention provides a test stand that makes possible an especially flexible and quasi location independent operability with structurally simple means.

Depending on the requirements the energy accumulator could be an electrically operated energy accumulator or a mechanically operated energy accumulator. An electrically operated energy accumulator could be designed in the form of an accumulator and could make repeated charging possible. A mechanically operated energy accumulator could realize an energy accumulator, for example, by means of rotational masses. In this case the key factor is that at least so much energy is stored that it is possible to test a motor vehicle in the required manner before it is necessary to re-charge again.

Such an energy accumulator could be externally chargeable. Such an external charging could be performed by means of a connection to a suitable electrical supply system. Having been charged in this way, the test stand could be used at any location. A conventional power grid could serve as the power supply system.

As an alternative to an external charging, the energy accumulator could be chargeable by a motor vehicle by way of the feeding device. In an especially advantageous situation, a motor vehicle to be inspected could carry out the charging of the energy accumulator in the required way, before the measurement or rather the testing of the motor vehicle takes place. In other words, the vehicle to be inspected could feed or generate the energy required for the self-testing and thereafter make this energy available by means of the energy accumulator.

With respect to an especially efficient and simple charging of the energy accumulator, the feeding device could be designed to convert the kinetic energy or mechanical energy, preferably rotational energy, into electric energy for the energy accumulator. Finally the feeding device could have a generator for generating electric energy.

In a specific advantageous embodiment of a test stand, the measuring device could have a rolling device for rolling the wheels of the motor vehicle, and the feeding device could be assigned to the rolling device or be coupled thereto or integrated therein. In other words, an interaction between a rolling device and the feeding device could be realized, so that energy for the energy accumulator could be generated by way of the rolling device. A motor vehicle—for example, the motor vehicle to be inspected—could drive onto the rolling device with its driven axle and drive said rolling device, so that the energy accumulated thereby is converted into electric energy by means of the feeding device and is fed to the energy accumulator.

An actuator or at least a roller or a conveyor belt of the rolling device could be driven with the energy accumulated in the energy accumulator. For this purpose a suitable electric motor could be provided. Furthermore, a measuring sensor and optionally an evaluation electronics of the test stand could be driven by means of the energy accumulated in the energy accumulator.

It would be advantageous to design the energy accumulator in such a way that it provides the electric energy required for at least one actuator or for the drive of at least one roller or a conveyor belt of the rolling device. In this case the size and the capacity of the energy accumulator must be based on the energy that is required to operate the measuring device.

With respect to an especially compact embodiment of the test stand the energy accumulator could be disposed between two rollers of the rolling device. This feature allows a single rolling device of the test stand to be manipulated jointly together with the energy accumulator and to be positioned at any location for an inspection of the vehicle.

Furthermore, the energy accumulator could be designed to provide the electric energy that is required to operate the measuring sensor. In this case, too, the size and the capacity of the energy accumulator could be based on the amount of energy required to operate the measuring sensor.

In an especially advantageous embodiment the energy accumulator could be assigned a monitoring device for the state of charge of the energy accumulator. The readiness of the test stand could be indicated optically and/or acoustically as a function of the state of charge. For this purpose suitable lighting means and/or a suitable sound generator could be provided.

In principle, the measuring device could begin to operate automatically by means of the energy in the energy accumulator, as soon as a predefined charge level of the energy accumulator is reached. In other words, a motor vehicle could initially provide the energy required for the inspection by means of the feeding device in the energy accumulator; and then upon reaching a predefined charge level, the test automatically begins. For this purpose the test stand or the measuring device could have a commensurate logic circuit or rather electronics. For example, the test stand or the measuring device could be suitably programmed by means of a computer that communicates with the test stand so that individual tests of the motor vehicle are made possible. In particular, such a computer could be used to define the specifiable charge level of the energy accumulator, at which the measuring device automatically beings to operate.

At this point there are a plethora of possibilities for designing and further developing the teaching of the present invention in an advantageous way. To this end, reference is made, on the one hand, to the dependent claims and, on the other hand, to the following description of a preferred exemplary embodiment of the invention by means of the drawing. In connection with the description of the preferred exemplary embodiment of the invention with reference to the drawing, preferred embodiments and further developments of the teaching are also elucidated in general.

BRIEF DESCRIPTION OF THE FIGURE

The single FIGURE is a schematic representation of an exemplary embodiment of an inventive test stand for motor vehicles.

DETAILED DESCRIPTION OF THE VARIOUS EMBODIMENTS

The single FIGURE is a schematic representation of a test stand for motor vehicles; and the test stand is designed as a roller type test stand. The test stand has a measuring device 2 comprising a measuring sensor 1 for collecting the test data. With respect to an especially flexible and quasi location independent operability of the test stand with structurally simple means, the test stand has a chargeable energy accumulator 3 for the purpose of providing the electric energy required to operate the measuring device 2; and the test stand has a feeding device 4 for feeding energy into the energy accumulator 3. An energy accumulator 3 that is charged by means of the feeding device 4 allows the test stand to be operated at different locations, even if the location does not have a power supply—for example, an electric power supply. This feature allows the test stand or test system to be operated in a quasi energy autonomous way.

In the exemplary embodiment shown in the single FIGURE the energy accumulator 3 is an electrically operated energy accumulator 3. The energy accumulator 3 can be externally charged. In the exemplary embodiment depicted herein, charging is made possible by means of a motor vehicle using the feeding device 4. In this case the motor vehicle to be inspected could bring about the charging. To this end the feeding device 4 is designed to convert kinetic energy or mechanical energy into electric energy for the energy accumulator 3.

In the specific case the measuring device 2 has a rolling device 5 for rolling the wheels 6 of the motor vehicle; and the feeding device 4 is assigned to the rolling device 5. In this case the feeding device 4 can be integrated into the rolling device 5 or more specifically into a roller 7 of the rolling device 5.

In a specific example the vehicle to be inspected could drive onto the rolling device 5 with its driven axle and then drive this rolling device. In this way then the conversion process of the rotational energy into electric energy by means of the roller 7 and the feeding device 4 can take place. Then the converted energy charges the energy accumulator 3 with electric energy via an electric connection 8—for example, a cable or a rigid line. The energy conversion process by means of a roller 7 and the feeding device 4 can be carried out until the energy accumulator 3 has accumulated enough energy to make it possible to test the motor vehicle using the energy that is present in the energy accumulator 3. On reaching a predefined charge level of the energy accumulator 3, the measuring device 2 could automatically begin to operate by means of the energy in the energy accumulator 3. For this purpose the energy accumulator 3 could be assigned a monitoring device for the state of charge of the energy accumulator 3. As soon as the monitoring device detects enough energy, the measuring process can automatically begin.

The energy accumulator 3 is dimensioned in such a way that it can absorb enough energy to guarantee, for example, that at least one roller 7 is driven for a corresponding test procedure—for example, a brake test. Furthermore, the energy accumulator 3 could additionally supply the measuring sensor 1 with the necessary electric energy. Moreover, the existing indicating devices and control units of the measuring device 2 could be operated with the energy accumulated in the energy accumulator 3.

With respect to providing an especially compact design of a test stand, the energy accumulator 3 is disposed between two rollers 7 of the rolling device 5. The energy accumulator 3 is designed as a quasi accumulator.

A suitable electric motor that could be integrated, for example, into the roller 7, could be used as the actuator for driving at least one roller 7.

In the specific case of a test stand the rolling device 5 could be driven by the motor vehicle; and, thus, a generator—for example, of the feeding device 4—could be operated. The accumulated energy is loaded into the energy accumulator 3 or rather the accumulator. Then this energy can drive an electric motor as well as all of the electronics and/or the measuring sensor 1 for the measuring technique or more specifically the measuring device 2. Owing to this technique the collected data and data relating to the control unit can be transmitted wirelessly and can be sent, for example, to a display and/or to an evaluation device. Basically the motor vehicle could be, for example, a passenger vehicle, a truck or a motorcycle.

With respect to other advantageous embodiments of the test stand according to the invention, reference is made to the general part of the description and to the accompanying claims for the sake of avoiding repetition.

Finally it must be pointed out that the above described exemplary embodiment serves only to elucidate the claimed teaching, but said claimed teaching is not restricted to this exemplary embodiment.

LIST OF REFERENCE NUMERALS

1 Measuring sensor
2 Measuring device
3 Energy accumulator
4 Feeding device
5 Rolling device
6 Wheel
7 Roller
8 Connection

The invention claimed is:

1. Test stand for motor vehicles, the test stand comprising:
a measuring device, the measuring device comprising:
a measuring sensor for collecting test data; and
a rolling device for rolling wheels of a motor vehicle, the rolling device comprising at least one of a roller and a conveyor belt,
wherein:
a chargeable energy accumulator is configured for providing electric energy required to operate the measuring device;
a feeding device is configured for feeding energy into the chargeable energy accumulator;
the chargeable energy accumulator is chargeable via the motor vehicle by way of the feeding device; and
the chargeable energy accumulator is configured to provide the electric energy required to drive the at least one roller and conveyor belt of the rolling device.

2. Test stand, as claimed in claim 1, wherein the energy accumulator is an electrically operated energy accumulator.

3. Test stand, as claimed in claim 1, wherein the energy accumulator is a mechanically operated energy accumulator.

4. Test stand, as claimed in claim 3, wherein the energy accumulator is mechanically operated via one or more rotational masses.

5. Test stand, as claimed in claim 1, wherein the energy accumulator is further configured to be externally chargeable.

6. Test stand, as claimed in claim 1, wherein the feeding device is configured for converting kinetic energy into electric energy for the energy accumulator.

7. Test stand, as claimed in claim 1, wherein the feeding device is configured for converting mechanical energy into electric energy for the energy accumulator.

8. Test stand, as claimed in claim 1, wherein the feeding device is configured for converting rotational energy into electric energy for the energy accumulator.

9. Test stand, as claimed in claim 1, wherein:
the feeding device is assigned to the rolling device.

10. Test stand, as claimed in claim 1, wherein:
the feeding device is coupled to the rolling device.

11. Test stand, as claimed in claim 1, wherein:
the feeding device is integrated within the rolling device.

12. Test stand, as claimed in claim 11, wherein the energy accumulator is configured to provide the electric energy required for at least one actuator of the rolling device.

13. Test stand, as claimed in claim 11, wherein the rolling device comprises at least two rollers and the energy accumulator is disposed between the at least two rollers.

14. Test stand, as claimed in claim 1, wherein the energy accumulator is configured to provide the electric energy required to operate the measuring sensor.

15. Test stand, as claimed in claim 1, further comprising a monitoring device configured to monitor the state of charge of the energy accumulator.

16. Test stand, as claimed in claim 1, wherein, when a predefined charge level of the energy accumulator is achieved, the measuring device automatically begins to operate via the energy in the energy accumulator.

17. Test stand, as claimed in claim 1, wherein the test stand is a stand selected from the group consisting of a roller type brake test stand and a belt conveyor type brake test stand.

* * * * *